Figure 1:
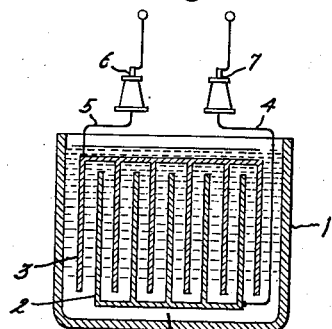

June 27, 1950   F. M. CLARK   2,512,886
DIELECTRIC COMPOSITION
Original Filed Oct. 17, 1946

DIELECTRIC COMPRISES ONE
OR MORE ESTERS OF TETRAHYDRO
FURFURYL ALCOHOL

DIELECTRIC IMPREGNANT
INCLUDES ESTER OF TETRAHYDRO
FURFURYL ALCOHOL

Inventor:
Frank M. Clark,
by Arthur Cohen
His Attorney

Patented June 27, 1950

2,512,886

UNITED STATES PATENT OFFICE 2,512,886

DIELECTRIC COMPOSITION

Frank M. Clark, Pittsfield, Mass., assignor to General Electric Company, a corporation of New York Original application October 17, 1946, Serial No. 703,897, now Patent No. 2,475,592, dated July 12, 1949. Divided and this application August 31, 1948, Serial No. 47,122

4 Claims. (Cl. 252—64)

The present invention comprises electric capacitors of improved characteristics containing as novel dielectric elements one or more esters of tetrahydro furfuryl alcohol. This application is a division of my co-pending application, Serial Number 703,897, filed October 17, 1946, now Patent No. 2,475,592, issued July 12, 1949, and assigned to the same assignee as the present invention.

Organic ester compositions as a class have heretofore been found to be unsuitable as dielectric materials. Their high dielectric loss has been considered as an inherent property, and their dielectric constant has not been especially attractive. Many of the esters which have the least unsatisfactory dielectric loss values, such as methyl stearate and other esters of the higher molecular weight organic acids, are objectionable not only because of their low dielectric constant values which causes application as capacitor insulants to be uneconomic but also because of their melting or freezing point properties. A dielectric composition is objectionable if it boils or melts within the normal temperature range of commercial use. Methyl stearate melts at about 38° C. and methyl palmitate melts at 28° C.

Generally speaking, the object of my invention is to increase the electrical capacitance of an electric capacitor per unit of physical volume as compared to electric capacitors now commercially available.

A more specific object of my invention is to produce an electric capacitor capable of operation at high frequency and at high voltage and with high electrical efficiency.

Another object of my invention is to supply an insulating liquid possessed of high electric capacitance and low dielectric loss and being characterized by freezing point of such low temperature value that even in the most extreme environmental temperatures, solidification with resulting loss in electrical capacitance will not occur.

These and other desirable advantages of my invention will be obvious to one skilled in the art of capacitor manufacture and application especially in the art of capacitor manufacture and application at high frequency, meaning thereby the range of 10,000 cycles to one megacycle and higher, which is the band of frequency most commonly used in the application of capacitors for industrial induction heating purposes.

I have discovered that esters of tetrahydro furfuryl alcohol unexpectedly possess not only high dielectric constants but also a combination of other properties which render such esters peculiarly well adapted for dielectric function in electric capacitors either alone or in combination with other dielectric materials.

Figure 2:
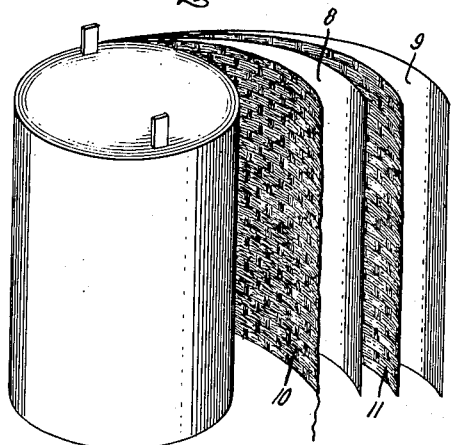
Figure 3:
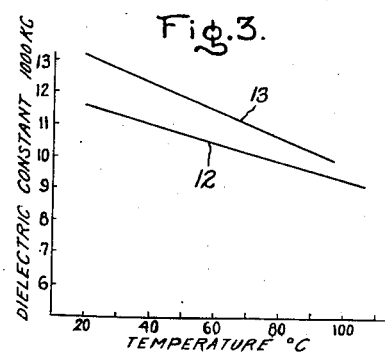

The accompanying drawing shows in Fig. 1 a spaced plate form of capacitor in which my invention may be embodied; Fig. 2 shows diagrammatically another embodiment; and Fig. 3 is a graph of the dielectric constant-temperature relation of dielectric compositions of my present invention.

I have found that the esters of tetrahydro furfuryl alcohol possess unexpected advantage for capacitor application as the sole dielectric between mechanically spaced armatures (Fig. 1) or as impregnants in a porous spacer for the armatures (Fig. 2). I have found that the organic esters of tetra furfuryl alcohol are characterized by low dielectric loss in the high frequency range normally used in industrial induction heaters and that each specific ester of tetrahydro furfuryl alcohol possesses a higher dielectric constant than obtained in the corresponding ester of other alcohol groups. These advantages are reflected in a smaller electrical capacitor per unit of capacitance required.

Particularly advantageous embodiments of my invention are the tetrahydro furfuryl esters of oxalic and benzoyl benzoic acids although other esters of tetrahydro furfuryl alcohol are capable of advantageous dielectric functioning, as for example, the tetrahydro furfuryl ester of oleic, ricinoleic and stearic acids.

By way of example, but not as a limitation, my invention may be illustrated by tetrahydro furfuryl ester of oxalic acid (tetrahydro furfuryl oxalate) as the sole dielectric between the mechanically spaced armatures of a fixed plate capacitor.

Fig. 1 illustrates a mechanically spaced fixed plate type of capacitor, comprising a receptacle 1 containing a liquid dielectric composition consisting of one or more esters of tetrahydro furfuryl alcohol. Immersed in such dielectric are spaced capacitor armatures 2, 3 which are connected by the conductors 4, 5 to terminal bushings 6, 7. The construction has been indicated diagrammatically as it is well understood.

In Fig. 2 is shown a capacitor comprising the combination of closely juxtaposed armatures 8, 9 of aluminum or copper foil or other suitable conductive material and an interposed layer 10, 11 between the armatures of suitable organic or inorganic dielectric material of porous structure, for example, woven glass fiber, cheesecloth or paper.

In a flat plate capacitor construction, even a non-porous dielectric spacer, such as mica or glass may be advantageously combined with the chosen tetrahydro furfuryl ester in order to displace pocketed air between the armatures. However, the improvement in capacity is highest in capacitors containing tetrahydro furfuryl ester in combination with spacer material of high porosity.

My invention is advantageously embodied in capacitors constructed for either high or low voltage application. For high voltage application I prefer the fixed plate capacitor design of Fig. 1. Such capacitor applications are usually of low microfarad capacitance values. The fixed plate design of Fig. 1 permits the full utilization of the unexpectedly high dielectric capacitance (dielectric constant) of the furfuryl esters while at the same time permitting easy removal of the heat generated during electrical operation at the high kilovolt-ampere values encountered. The rolled or wound type of capacitor illustrated in Fig. 2 is particularly applicable in many electronic applications where high microfarad capacitance at relatively low voltage is required. The spacing of the armatures by means of thin woven glass or cloth or equivalent material as stated gives a more economical and efficient way of separating the armatures at small gap spacings than is obtained with the fixed plate capacitor of Fig. 1. Since most materials suitable as spacing materials are of lower electrical capacitance than the tetrahydro furfuryl ester composition, the more porous spacing material is preferred. The greater the amount of furfuryl ester contained between the capacitor armatures, the greater the electrical capacitance of the finished capacitor.

Illustrative of the advantages of my invention, is tetrahydro furfuryl oxalate. Tetrahydro furfuryl oxalate is a substantially colorless liquid which boils in the largest amount between 280° C. and 290° C., when technically purified. Chemically pure tetrahydro furfuryl oxalate is not required. In fact I have found that tetrahydro furfuryl oxalate which possesses a wide range of boiling point is equally applicable. Such a material consists of a blend of the dioxalate ester and small amounts of the mono-oxalate ester and gives a boiling range between 170 and 290° C. although more than 90% boils between 256 and 290° C. and more than 50% between 280 and 290° C. Such a liquid has a freezing point of about —54° C., a refractive index at 25° C. of about 1.4689 and a specific gravity of about 1.204 at 15.5/15.5° C. It possesses a flash point of about 152° C. and a burn point of about 176° C. Tetrahydro furfuryl oxalate is characterized by high dielectric strength and an unexpectedly high dielectric constant of about 11.5 which renders it peculiarly advantageous as a capacitor dielectric. Its low power factor at high frequency and its high dielectric constant at high frequency combine to make a dielectric of this composition both technically and economically advantageous. The high dielectric constant gives a capacitor provided therewith a high electrical capacitance per unit of physical volume. The low power factor prevents heat accumulation with consequent hazard of over-heating and the ultimate failure of the capacitor.

Graph 12 of Fig. 3 shows the dielectric constant of tetrahydro furfuryl oxalate ranges from about 11.5 at 25° C. to about 9 at 100° C. The dielectric constant of mineral oil over the same range of temperatures is about 2 to 2.25. Conventional liquid dielectric materials heretofore used in high frequency capacitor application possess a dielectric constant of approximately 4. A tetrahydro furfuryl oxalate ester composition therefore possesses marked advantage by reason of its high dielectric constant.

In a selected fixed plate capacitor of the type illustrated in Fig. 1 and possessing a 100 mil gap spacing suitable for voltage application at 5000 to 10,000 volts over the frequency range up to about one megacycle, the capacity was increased over five fold when tetrahydro furfuryl oxalate replaced an oil dielectric therein. A typical capacitor containing mineral oil as dielectric had a capacity of 48 mm farads. A similar capacitor of the same construction which in place of mineral oil contained as dielectric material tetrahydro furfuryl oxalate had a capacity of 248 mm farads.

In like manner, when an open woven or highly porous or absorptive spacer is used to separate the metal foil armatures of a wound capacitor such as is illustrated in Fig. 2 a similarly high capacitance value is obtained when the tetrahydro furfuryl oxalate functions as the liquid impregnant. The increase in capacity is highest when the amount of liquid permitted between the electrode armatures is a maximum (i. e., the more absorptive and porous the spacer). In a selected wound capacitor of the type illustrated in Fig. 2, aluminum foil armatures were separated by means of a woven glass cloth .003" thick and having a woven mesh of glass threads 60 x 64 to the inch. When treated with tetrahydro furfuryl oxalate, the capacity was increased about 2½ times over the capacity obtained with mineral oil impregnation, the capacity being increased from 384 mm farads to 987 mm farads.

Although I have illustrated my invention with reference to the tetrahydro furfuryl ester of oxalic acid (tetrahydro furfuryl oxalate) I do not wish to be so limited. I have found that other tetrahydro furfuryl esters are of similar advantage. Among these esters is tetrahydro furfuryl benzoyl benzoate. This ester possesses even greater dielectric capacitance than that possessed by the tetrahydro furfuryl oxalate. As shown in graph 13 of Fig. 3 the dielectric constant is about 13 at 25° C. and about 10 at 100° C. This dielectric offers even greater advantage in capacitance than tetrahydro furfuryl oxalate. Because of its higher freezing point (+8° C.), however, tetrahydro furfuryl benzoyl benzoate ordinarily is preferred as a dielectric for capacitors intended for environments where the temperature does not fall to lower than about 10° C. thus avoiding solidification of the ester. Such solidification would cause the formation of voids and gas pockets, the presence of which promotes ionization discharge which ultimately leads to capacitor failure.

Tetrahydro furfuryl benzoyl benzoate when technically pure and suitable for use as described possesses the following approximate characteristics:

Light yellow to colorless liquid.
Refractive index (25° C.) _____ 1.5754
Boiling range (1 mm. Hg) _____°C__ 200–225
Viscosity (S. U. 100° C.) _____seconds__ 75
Specific gravity (65°/15.5° C.) _____ 1.157
Pour or congealing point _____°C__ 8

Within the scope of the appended claims, I wish to include dielectric compositions comprising mixtures including one or more of the organic acid esters of tetrahydro furfuryl alcohol. Such compositions in addition to possessing the desirable properties described in the foregoing paragraphs are characterized by a freezing point which is lower than either of the constituents of the mixture and possess other additional advantages. In many applications of my new compositions it is desirable that the liquid dielectric shall not solidify at temperatures at least as low as zero degrees centigrade. For such applications the tetrahydro furfuryl esters of stearic acid and oleic acid are not suitable because of their melting points which are about 20° and 18° C. respectively. Solidification results in void formation and cracks which ionize under voltage and promote dielectric and chemical deterioration which ultimately results in the dielectric breakdown of the capacitor of which they are a part. A dielectric composition consisting by weight of 25 parts of the stearate ester blended with 75 parts of the oleate ester is a liquid having a congealing point of about zero degrees centigrade. Such a composition has the following properties:

Specific gravity (25° C.) _____ .933
Refractive index (25° C.) _____ 1.4610
Power factor (1000 kilocycles) __per cent__ .093

Other blends of the oleate and stearate also possess lower freezing points than either of the constituents. A blend consisting of equal parts of the esters congeals at +11° C.

In like manner other esters of tetrahydro furfuryl alcohol may be employed with similarly advantageous results. I may employ compositions of organic esters, only one of which is the tetrahydro furfuryl alcohol ester. For example, dibutyl sebacate is an organic ester which possesses excellent dielectric characteristics for capacitor use at high frequency except that it has a congealing point of about −5° C. and a dielectric constant of only about 4.4. A composition consisting by weight of 75 parts of the dibutyl sebacate and 25 parts of tetrahydro furfuryl benzoyl benzoate (melting point 8° C.) has a dielectric constant of about 6.4 at 1000 kilocycles and a congealing point of −15° C. Even more advantageous results are obtained with a composition comprising 75 parts of such benzoyl benzoate and 25 parts of the dibutyl sebacate. Such a composition congeals at −22° C. and has a dielectric constant of 11.3 tested at 1000 kilocycles. This composition is characterized by a specific gravity at 15.5/15.5° C. of 1.125 and a refractive index at 25° C. of 1.5339.

Other organic acid esters of tetrahydro furfuryl alcohol which I have found to possess suitable characteristics and which I desire to include within the scope of my invention are the tetrahydro furfuryl esters of recinoleic acid, caprylic acid and palmitic acid.

What I claim as new and desire to secure by Letters Patent of the United States is:

1. A liquid dielectric composition consisting of, by weight, (1) from about twenty-five to seventy-five parts of an ester of tetrahydro furfuryl alcohol and (2) from about seventy-five parts to twenty-five parts of an ester selected from the group consisting of dibutyl sebacate and esters of tetrahydro furfuryl alcohol unlike that in (1).

2. A liquid dielectric composition consisting of, by weight, from about twenty-five to seventy-five parts of an ester of tetrahydro furfuryl alcohol and from about seventy-five parts to twenty-five parts of dibutyl sebacate.

3. A liquid dielectric composition consisting by weight of about one-fourth tetrahydro furfuryl stearate and three-fourths tetrahydro furfuryl oleate.

4. A liquid dielectric composition consisting by weight of about one-fourth to one-half tetrahydro furfuryl stearate and about one-half to three-fourths tetrahydro furfuryl oleate.

FRANK M. CLARK.

REFERENCES CITED

The following references are of record in the file of this patent:

UNITED STATES PATENTS

| Number | Name | Date |
|---|---|---|
| 2,007,792 | Clark | July 9, 1935 |
| 2,153,139 | Dickey et al. | Apr. 4, 1939 |
| 2,257,870 | Trautman | Oct. 7, 1941 |
| 2,330,238 | Prutton | Sept. 28, 1943 |
| 2,475,592 | Clark | July 12, 1949 |

Certificate of Correction

Patent No. 2,512,886                                            June 27, 1950

FRANK M. CLARK

It is hereby certified that error appears in the printed specification of the above numbered patent requiring correction as follows:

Column 2, line 17, for "tetra" read *tetrahydro*;

and that the said Letters Patent should be read as corrected above, so that the same may conform to the record of the case in the Patent Office.

Signed and sealed this 16th day of January, A. D. 1951.

[SEAL]

THOMAS F. MURPHY,
*Assistant Commissioner of Patents.*